United States Patent
Kihara

(10) Patent No.: US 6,747,770 B2
(45) Date of Patent: Jun. 8, 2004

(54) HOLOGRAPHIC STEREOGRAM EXPOSURE APPARATUS, METHOD THEREOF, AND HOLOGRAPHIC STEREOGRAM GENERATION SYSTEM

(75) Inventor: Nobuhiro Kihara, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/875,021

(22) Filed: Jun. 7, 2001

(65) Prior Publication Data

US 2002/0018255 A1 Feb. 14, 2002

(30) Foreign Application Priority Data

Jun. 8, 2000 (JP) .................................. P2000-172616

(51) Int. Cl.[7] ............................................... G03H 1/26
(52) U.S. Cl. ........................... 359/23; 359/30; 359/22
(58) Field of Search ............................. 359/23, 22, 30, 359/462, 463, 468, 469, 900; 396/324, 327, 330

(56) References Cited

U.S. PATENT DOCUMENTS 4,082,415 A * 4/1978 Brooks et al. ............... 359/20
4,783,133 A * 11/1988 Chen ........................... 359/23
4,834,476 A * 5/1989 Benton ........................ 359/23
5,473,447 A * 12/1995 Molteni et al. .............. 359/13

* cited by examiner

Primary Examiner—Thong Nguyen
Assistant Examiner—Arnel C. Lavarias
(74) Attorney, Agent, or Firm—Rader, Fishman & Grauer PLLC; Ronald P. Kananen

(57) ABSTRACT

An illuminating optical system 36 evenly spreads an object beam L3 split from a beam splitter 34. When a control computer sends a number of images in the parallax direction, a spatial light modulation section (liquid crystal) 38 displays these images in that number of divisions under control of the control computer. A superposed projection optical system 39 superposes and projects light beams passing through the spatial light modulation section 38. A beam-condensing projection optical system 41 condenses a projected image's beam from the superposed projection optical system 39 in the parallax direction and forms this image in the non-parallax direction on the surface of a hologram recording medium 42.

15 Claims, 12 Drawing Sheets

76 : ELEMENT HOLOGRAM

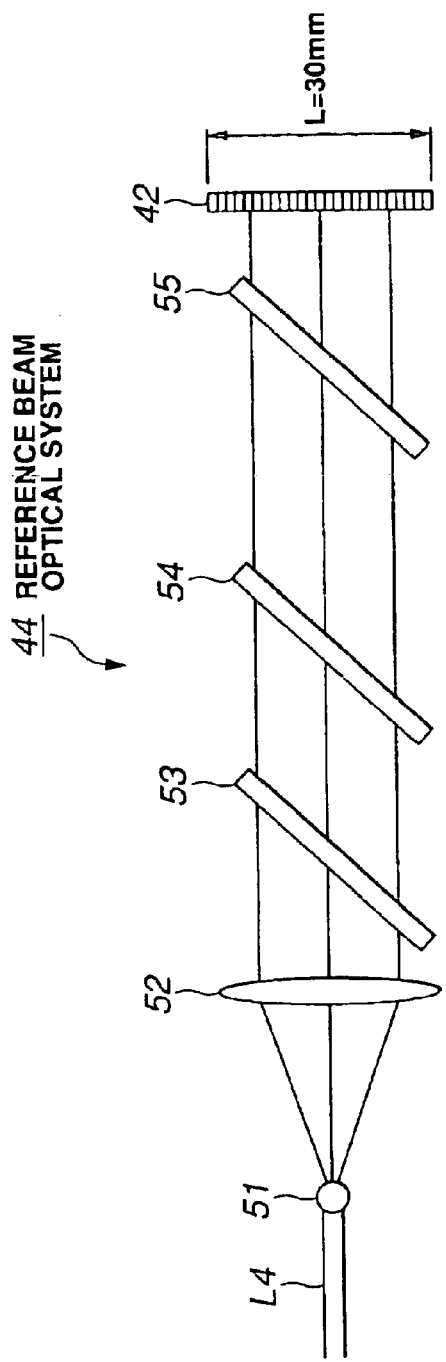
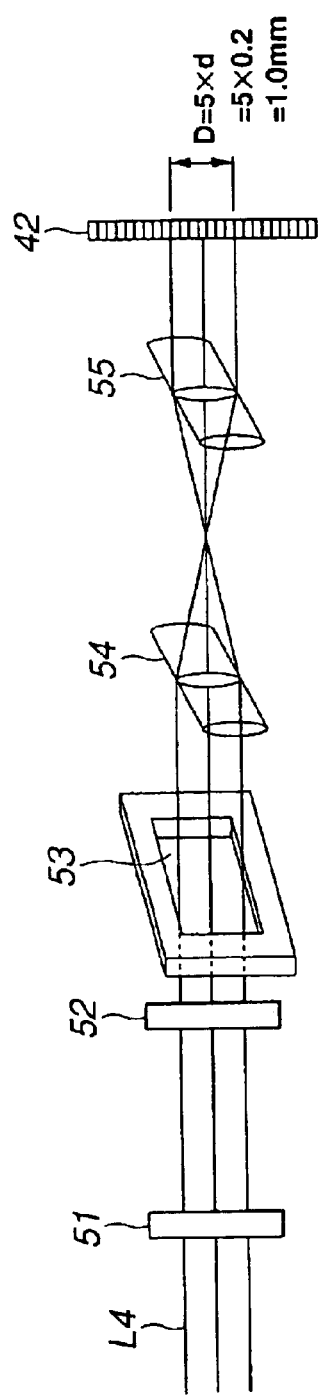
FIG.3A
FIG.3B

OVERALL

CENTER

BOTTOM

HOLOGRAPHIC STEREOGRAM EXPOSURE APPARATUS, METHOD THEREOF, AND HOLOGRAPHIC STEREOGRAM GENERATION SYSTEM

TECHNICAL FIELD OF THE INVENTION

The present invention relates to a holographic stereogram exposure apparatus, a method thereof, and a holographic stereogram generation system for exposing 3-D image information on a hologram recording medium.

BACKGROUND OF THE INVENTION

To create a holographic stereogram, for example, a subject is photographed from different observation points to generate many images as original images. These images are sequentially recorded as strip-shaped or dot-shaped element holograms on a single holographic recording medium.

For example, FIG. 12 shows a holographic stereogram having parallax information in a horizontal direction only. A subject 100 is sequentially photographed crosswise from different observation points to generate a plurality of original images 101a to 101e. An image recording apparatus sequentially records these original images as element holograms in strips on a holographic recording medium 102, generating the holographic stereogram.

Image information is obtained by sequentially photographing from different observation points along a cross direction and is sequentially recorded crosswise as element holograms in strips. When an observer views this holographic stereogram with both eyes, right and left eyes accept slightly different 2-D images respectively. This causes the observer to feel parallax, reproducing a 3-D image.

Meanwhile, the hologram exposure is very sensitive to vibrations. During the exposure time, an optical system must not vibrate on a recording wavelength scale. As mentioned above, however, a holographic stereogram may be generated by exposing thin slit element holograms one by one. In this case, it is necessary to wait until a vibration attenuates between exposures to some extent. This has been a hindrance to shorten the time to generate holograms. Since only the inside of an element hologram is exposed, the other beams are discarded as unnecessary beams. After all, this increases the total exposure time and requires a costly, high-power laser, causing unfavorable effects.

The present invention has been made in consideration of the foregoing. It is therefore an object of the present invention to provide a holographic stereogram exposure apparatus, a method thereof, and a holographic stereogram generation system capable of shortening the time for generating holograms.

SUMMARY OF THE INVENTION

A holographic stereogram exposure apparatus according to the present invention exposes 3-D image information to a hologram recording medium, including: an object beam optical system which superposes and projects light beams passing through a plurality of images separately displayed in a parallax direction and then condenses these beams to project images on the hologram recording medium corresponding to the number of separations; and a reference beam optical system which projects a reference beam onto the hologram recording medium for interference with the image projected on the hologram recording medium.

The object beam optical system comprises spatial light modulation means for separately displaying a plurality of images in the parallax direction, a superposed projection optical system for superposing and projecting beams passing through this spatial light modulation means, and a beam-condensing projection optical system for converging a projected image from this superposed projection optical system onto a face of the hologram recording medium.

Consequently, the superposed projection optical system superposes beams passing through a plurality of images separately displayed in the parallax direction by the spatial light modulation means. The beam-condensing projection optical system converges the superposed projected images on a hologram recording medium's face, enabling a plurality of element holograms to be exposed at a time.

Also, a holographic stereogram exposure method according to the present invention exposes 3-D image information onto a hologram recording medium, including: an object beam projection step for superposing and projecting light beams passing through a plurality of images separately displayed in a parallax direction and then condensing these beams to project images on the hologram recording medium corresponding to the number of separations; and a reference beam projection step for projecting a reference beam onto the hologram recording medium for interference with the object beam projected on the hologram recording medium by means of the object beam projection step.

The object beam projection step separately displays a plurality of images in the parallax direction, superposes and projects light beams passing through this separately displayed image, converges the projected image on the hologram recording medium surface in a parallax direction, and forms the projected image in a non-parallax direction.

Further, a holographic stereogram generation system according to the present invention records 3-D image information on a hologram recording medium and generates a holographic stereogram, including: an image generation system for generating a plurality of images in a parallax direction; an object beam optical system for separately displaying a plurality of images generated by the image generation system in a parallax direction, superposing, projecting, and converging beams passing through the plurality of separately displayed images, and projecting images corresponding to the number of separations on the hologram recording medium; and a reference beam optical system for projecting a reference beam on the hologram recording medium for interference with the image projected on the hologram recording medium by the object beam optical system.

BRIEF DESCRIPTION OF DRAWINGS

FIGS. 3A and 3B are a detail view showing a reference optical system in the holographic stereogram exposure apparatus.

DETAILED DESCRIPTION OF THE INVENTION

Embodiments of the present invention will be described in further detail with reference to the accompanying drawings. The present invention is not limited to the following examples. It is further understood by those skilled in the art that various changes and modifications may be made in the present invention without departing from the spirit and scope thereof.

Figure 1:
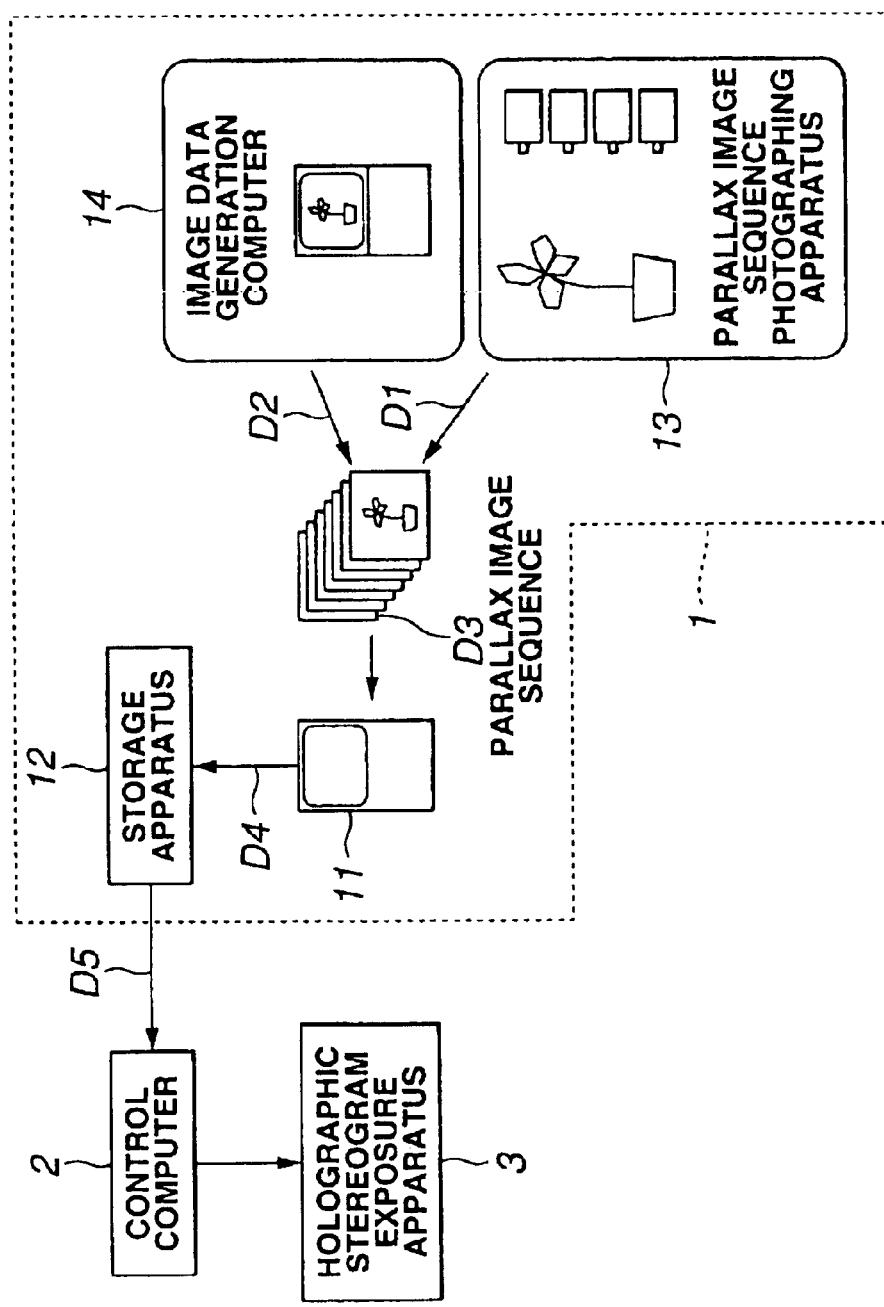
FIG. 1 is a configuration chart showing a holographic stereogram generation system as an embodiment of the present invention.

This embodiment provides a system for generating a so-called one-step holographic stereogram. This means that a hologram recording medium records an interference pattern of object beams and reference beams and is used as a holographic stereogram as is. As shown in FIG. 1, the system comprises a data processing section 1, a control computer 2, and a holographic stereogram exposure apparatus 3. The data processing section 1 processes image data to be recorded. The control computer 2 controls the entire system. The holographic stereogram exposure apparatus 3 uses an optical system for holographic stereogram exposure to expose 3-D image information to a hologram recording medium.

The data processing section 1 generates a parallax image sequence D3 based on a plurality of image data D1 and D2 including parallax information. The image data D1 is supplied from a parallax image sequence photographing apparatus 13 having a multi-lens camera or a mobile camera. The image data D2 is generated from an image data generation computer 14.

The above-mentioned image data D1 supplied from a parallax image sequence photographing apparatus 13 comprises a plurality of images captured by photographing a subject from different points in the horizontal direction. In order to generate the plurality of images, say, a multi-lens camera is used for simultaneous photographing or a mobile camera is used for continuous photographing.

The above-mentioned image data D2 comprises, say, a plurality of CAD (Computer Aided Design) or CG (Computer Graphics) images and the like generated by sequentially providing parallax in the horizontal direction.

The data processing section 1 uses an image processing computer 11 to apply specified image processing for holographic stereogram to the parallax image sequence D3. When specified image processing is applied to image data D4, this image data is stored in a storage apparatus 12 such as memory or a hard disk.

When recording images on a hologram recording medium, the data processing section 1 sequentially reads data from the image data D4 recorded in the storage apparatus 12 and transmits this image data D5 to the control computer 2.

The control computer 2 drives the holographic stereogram exposure apparatus 3 to record images based on the image data D5 supplied from the data processing section 1. These images are sequentially recorded as, say, strip-shaped element holograms on a hologram recording medium installed in the holographic stereogram exposure apparatus 3.

As will be described later, the control computer 2 sends a plurality of images, say five images, to a spatial light modulation section in the holographic stereogram exposure apparatus 3 along a parallax direction. The control computer controls the spatial light modulation section to display the five images separately. The control computer 2 also controls a shutter, a recording medium feed mechanism, and the like provided in the holographic stereogram exposure apparatus 3.

Figure 2:
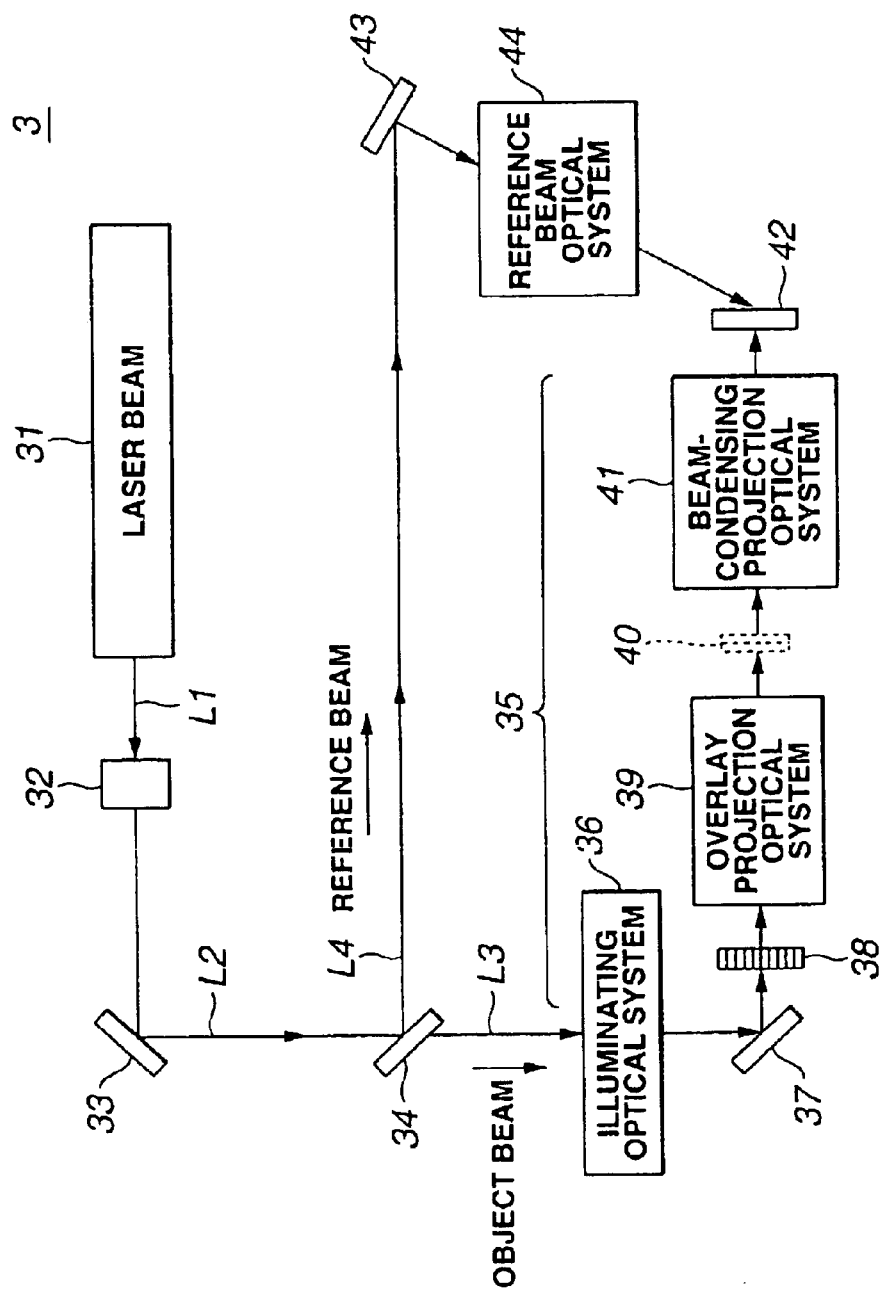
FIG. 2 is a configuration chart showing a holographic stereogram exposure apparatus constituting the holographic stereogram generation system.

The following describes the holographic stereogram exposure apparatus 3 with reference to FIG. 2. As shown in this figure, the holographic stereogram exposure apparatus 3 comprises a laser beam source 31, a shutter 32, a mirror 33, and a beam splitter 34. The laser beam source 31 generates a laser beam with a specified wavelength. The shutter 32 passes or blocks a laser beam L1 from the laser beam source 31 for exposing element holograms. The mirror 33 perpendicularly bends the laser beam passing through the shutter 32. The beam splitter 34 splits the laser beam L2 perpendicularly bent by the mirror 33 into an object beam L3 and a reference beam L4.

The holographic stereogram exposure apparatus 3 includes an object beam optical system 35 and a reference beam optical system 44. The object beam optical system 35 uses the object beam L3 to project an image onto a hologram recording medium 42 as a hologram exposure face. The reference beam optical system 44 projects the reference beam L4 for interference with the image projected on the hologram recording medium 42 by the object beam optical system 35.

The reference beam L4 is split by the beam splitter 34 and is reflected on the mirror 43. For interference with the object beam L3 on the hologram exposure face (hologram recording medium 42), the reference beam optical system 44 changes the reference beam L4 to a specified element hologram size and projects it on the hologram recording medium 42. FIG. 3A and 3B show an example of the reference beam optical system 44. FIG. 3A is a top view and FIG. 3B is a side view thereof. The following describes an example of generating a holographic stereogram comprising an element hologram of 0.2 mm wide (d) and 30 mm long (L). The reference beam L4 entering a cylindrical lens 51 is spread only in the horizontal direction and then enters a collimating cylindrical lens 52 to be formed to a parallel beam. As will be described later in detail, the reference beam L4 as a parallel beam passes through a slit 53 (D×L=5d× L=5×0.2 mm×30 mm). The slit 53 is telecentrically projected on the surface of the hologram recording medium 42 by means of a first cylindrical lens 54 and a second cylindrical lens 55 with the magnification of −1, producing a specified reference beam.

The following describes the object beam optical system 35. It comprises an illuminating optical system 36 (described later), a spatial light modulation section 38, a superposed projection optical system 39, and a beam-condensing projection optical system 41. The superposed projection optical system 39 superposes and projects the beam passing through the spatial light modulation section 38. With respect to a projected image from the superposed projection optical system 39, the beam-condensing projection optical system 41 condenses a beam in the parallax direction and forms an image in the non-parallax direction on the surface of the hologram recording medium 42.

Figure 4:
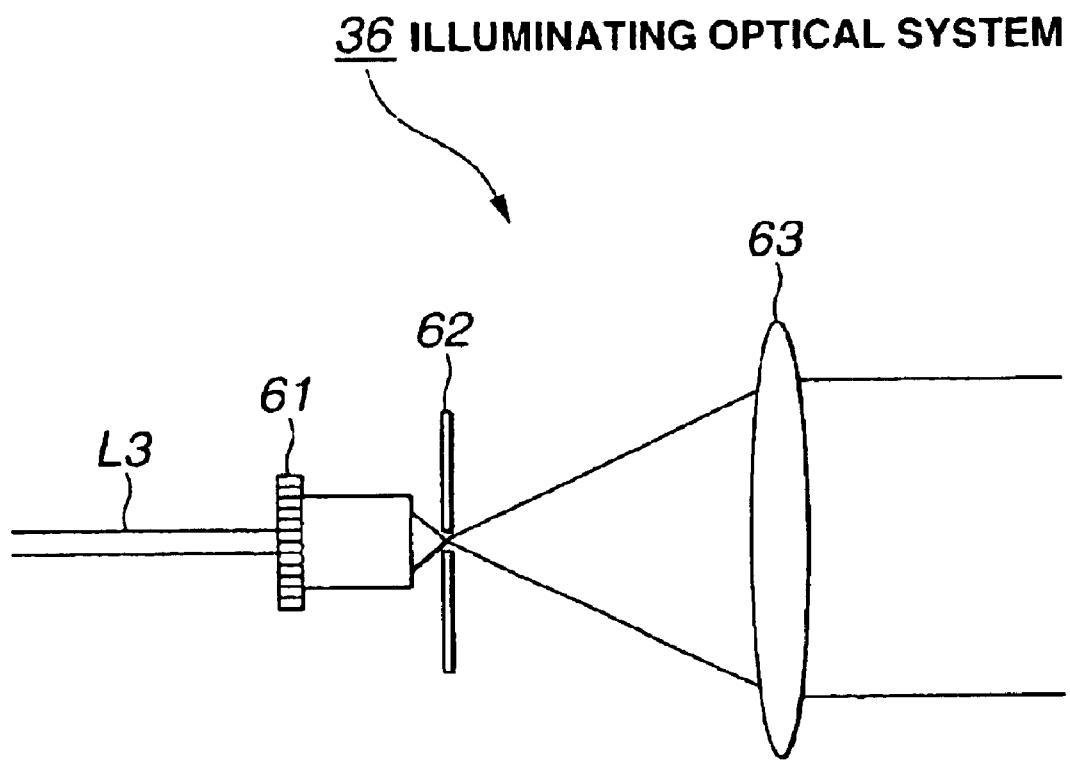
FIG. 4 is a detail view showing an illuminating optical system constituting an object beam optical system in the holographic stereogram exposure apparatus.

The following describes components constituting the object beam optical system 35. The illuminating optical system 36 is described first. The illuminating optical system 36 evenly spreads the object beam L3 split from the beam splitter 34. The evenly split object beam L3 is perpendicularly bent by the mirror 37 and is irradiated to the spatial light modulation section 38. FIG. 4 shows an example of the illuminating optical system 36. In this example, a microscopic object lens 61 spreads an incident beam. A pinhole provided on a pinhole member 62 is used for removing a noise from the beam to generate a laser beam having the Gaussian distribution. Then a collimating lens 63 is used to generate a parallel beam. In addition to this example, it may be preferable to use a light integrator.

The spatial light modulation section 38 uses a liquid crystal. The spatial light modulation section 38 displays, in the parallax direction, a plurality of images, say, five images sent from the control computer 2 as shown in FIG. 1. These images are split into five portions under control of this computer. The following describes this section as the liquid crystal 38.

The following describes the superposed projection optical system 39. The superposed projection optical system 39 is most characteristic to the present invention. It is possible to expose many element holograms at a time due to the effect of this superposed projection optical system 39 and the beam-condensing projection optical system 41 to be described later. This embodiment shows an example of splitting the liquid crystal (spatial light modulation section) 38 into five portions in the parallax direction. For simplicity of discussion, the following description is divided into the parallax and non-parallax directions. Finally, the superposed projection optical system is explained as a whole.

Figure 5:
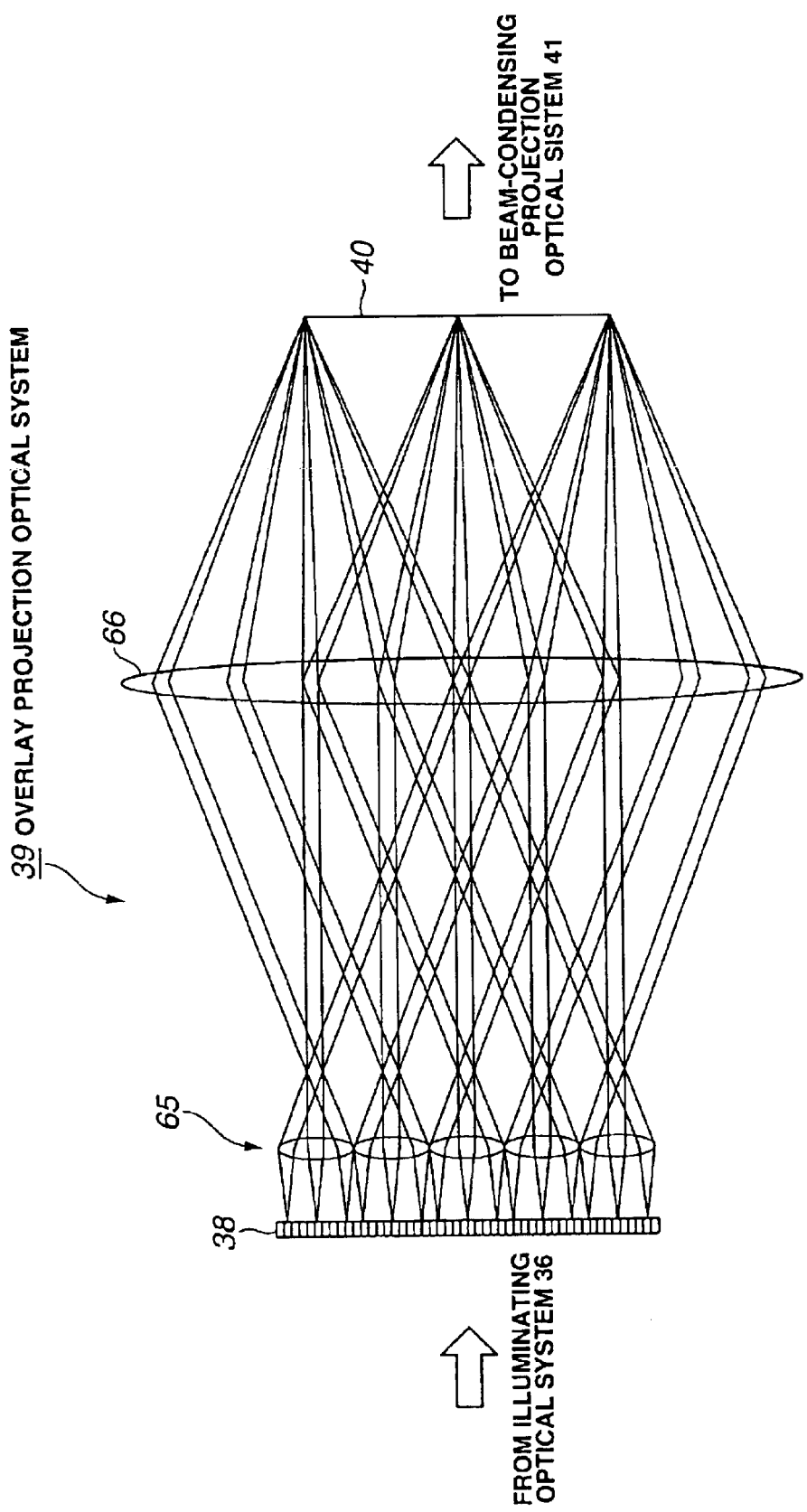
FIG. 5 is a detail view showing a parallax direction of a superposed projection optical system constituting the object beam optical system.
Figure 6A:
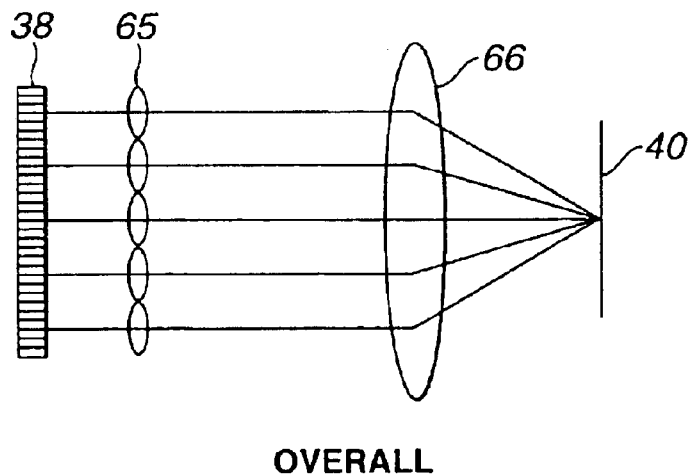
FIGS. 6A, 6B and 6C are partial diagrammatic views showing an optical path in the superposed projection optical system.
Figure 6B:
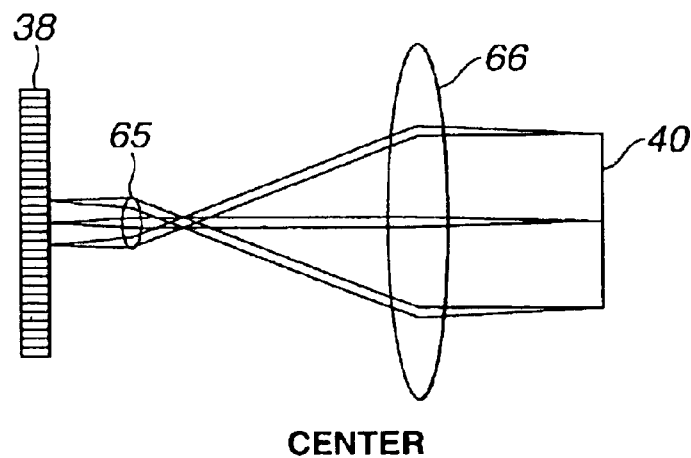
Figure 6C:
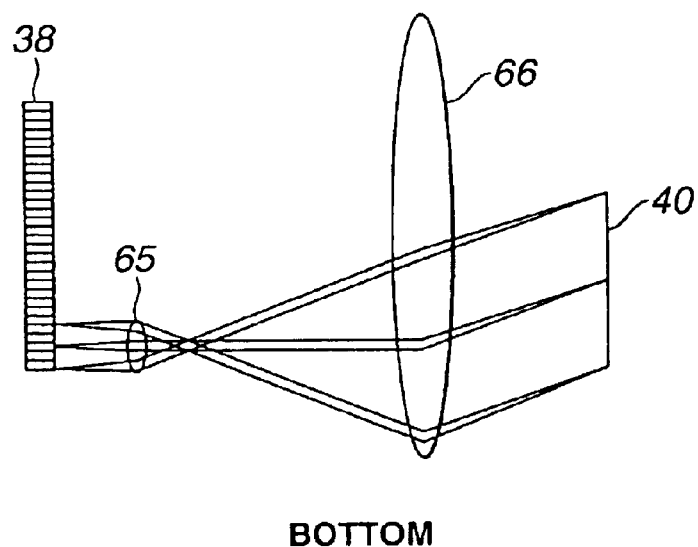

First, the parallax direction (side view) of the superposed projection optical system 39 is explained with reference to FIG. 5. After passing through the illuminating optical system 36, the laser beam evenly illuminates the face of the liquid crystal 38 in FIG. 5. The beam passing through the liquid crystal 38 reaches a lenticular lens 65 divided into five portions and then passes through the optical path as shown in this figure. This optical path is explained with reference to FIG. 6A to FIG. 6C. FIG. 6A shows the entire optical path. FIG. 6B shows an enlarged detail of the center of the optical path. FIG. 6C shows an enlarged detail of the bottom thereof. Each of five divisions of the superposed projection optical system 39 forms an image 40 to the right of a lens 66. Further, it is understood that images for the five divisions on the liquid crystal 38 are superposed on the same positions. When the liquid crystal 38 is divided into five portions, this optical system needs to have a projection magnification of 5 so that the same size is maintained between the image 40 for the liquid crystal 38 and the original image.

Figure 7:
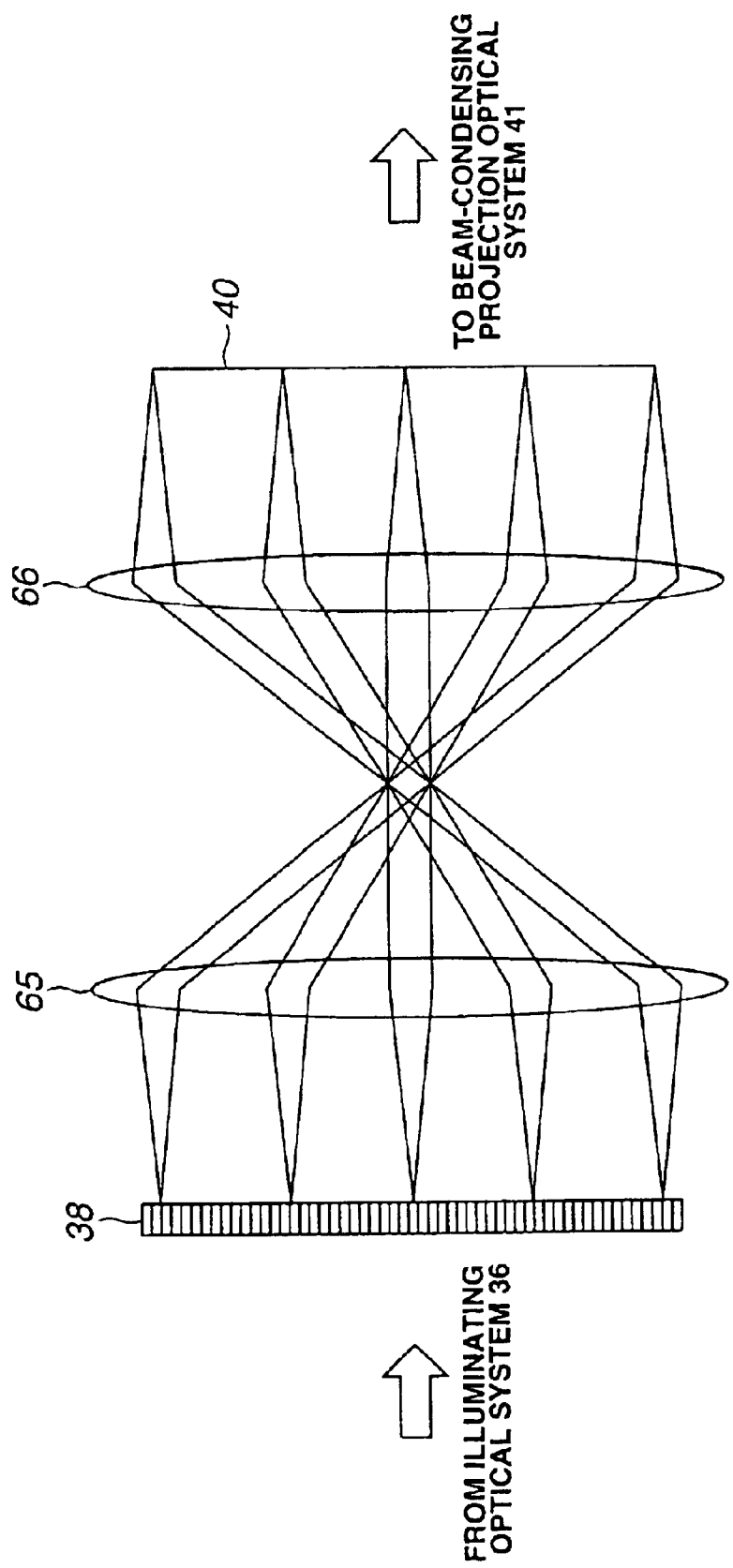
FIG. 7 is a detail view showing a non-parallax direction of the superposed projection optical system constituting the object beam optical system.

Then, the non-parallax direction (top view) of the superposed projection optical system 39 is explained with reference to FIG. 7. The liquid crystal 38 is not divided in the non-parallax direction. The liquid crystal 38 can be projected as is with the projection magnification of 1.

The whole of the superposed projection optical system 39 can be provided by combining the parallax direction and the non-parallax direction as mentioned above. The optical systems for the parallax and non-parallax directions can comprise cylindrical lenses. Actually, however, the cylindrical lens is subject to, say, aberration in a direction having no power. Instead of simple combinations, the design must be considered so that the entire aberration is decreased. The above description does not cover parameters such as a focal length for the lens system. These values will be described with respect to parameters for the beam-condensing projection optical system to be described later.

Figures 8A, 8B:
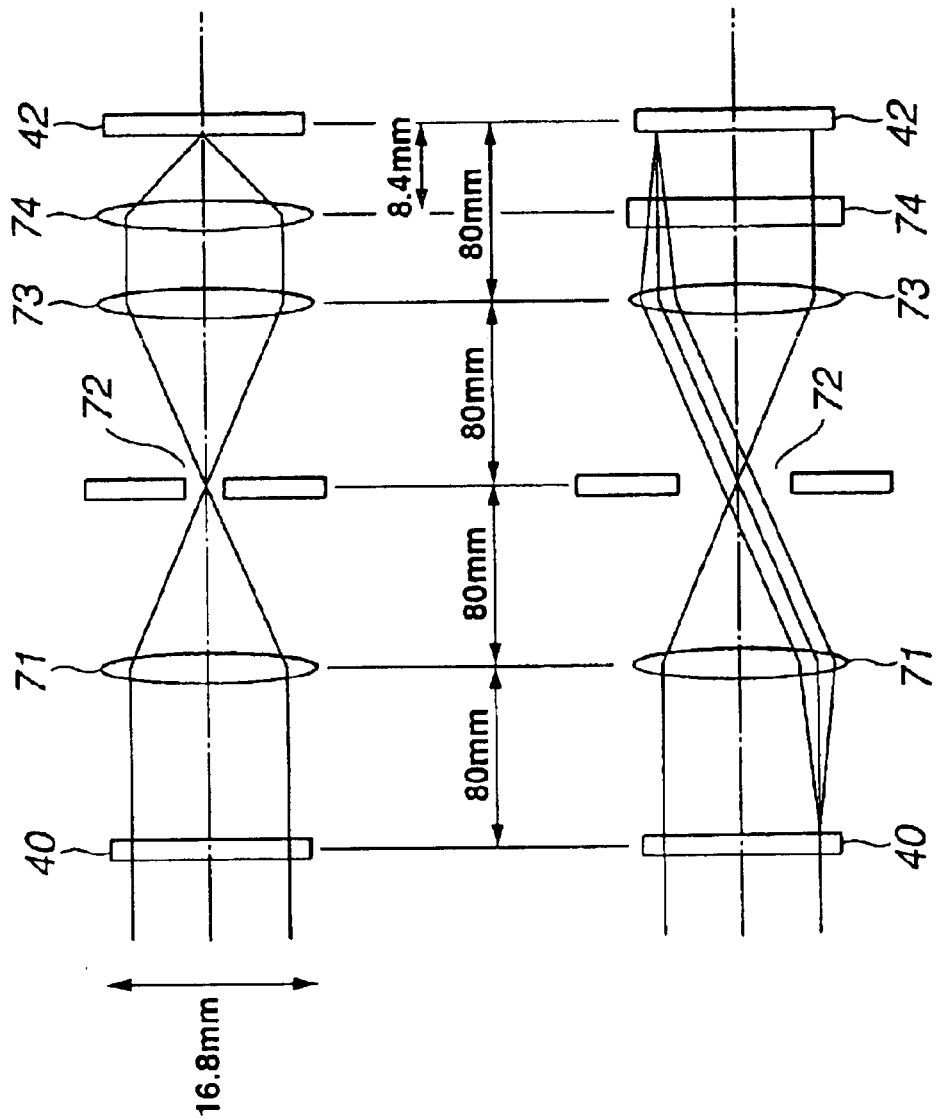
FIGS. 8A and 8B are a detail view showing a beam-condensing projection optical system constituting the object beam optical system.

The, following describes the beam-condensing projection optical system 41 with reference to FIG. 8A and FIG. 8B. FIG. 8A shows a side view. FIG. 8B shows a top view. This optical system condenses a beam for the liquid crystal's image 40 in the parallax direction (A) and forms this image in the non-parallax direction (B) on the surface of the hologram recording medium 42. This effect makes a holographic stereogram to be visible in 3-D. As shown in FIG. 8A and FIG. 8B, the beam-condensing projection optical system 41 uses a first lens 71 to project the liquid crystal's image 40 for passing through a slit 72 and uses a second lens 73 to let the beam enter a beam-condensing cylindrical lens 74. The beam-condensing cylindrical lens 74 condenses the image's beam in the parallax direction for entering the hologram recording medium 42 and forms the image in the non-parallax direction. The basic configuration of this optical system is the same as that of a conventional beam-condensing projection optical system except that the present invention uses a different value for the width of the slit 72. Conventionally, when an element hologram has a width of 0.2 mm, the slit width becomes 0.2×80/8.4=1.905 mm as seen from the figure. This is the slit width in the parallax direction, namely within the side view in FIG. 8A, providing no restrictions on the slit width within the top view.

Figure 9:
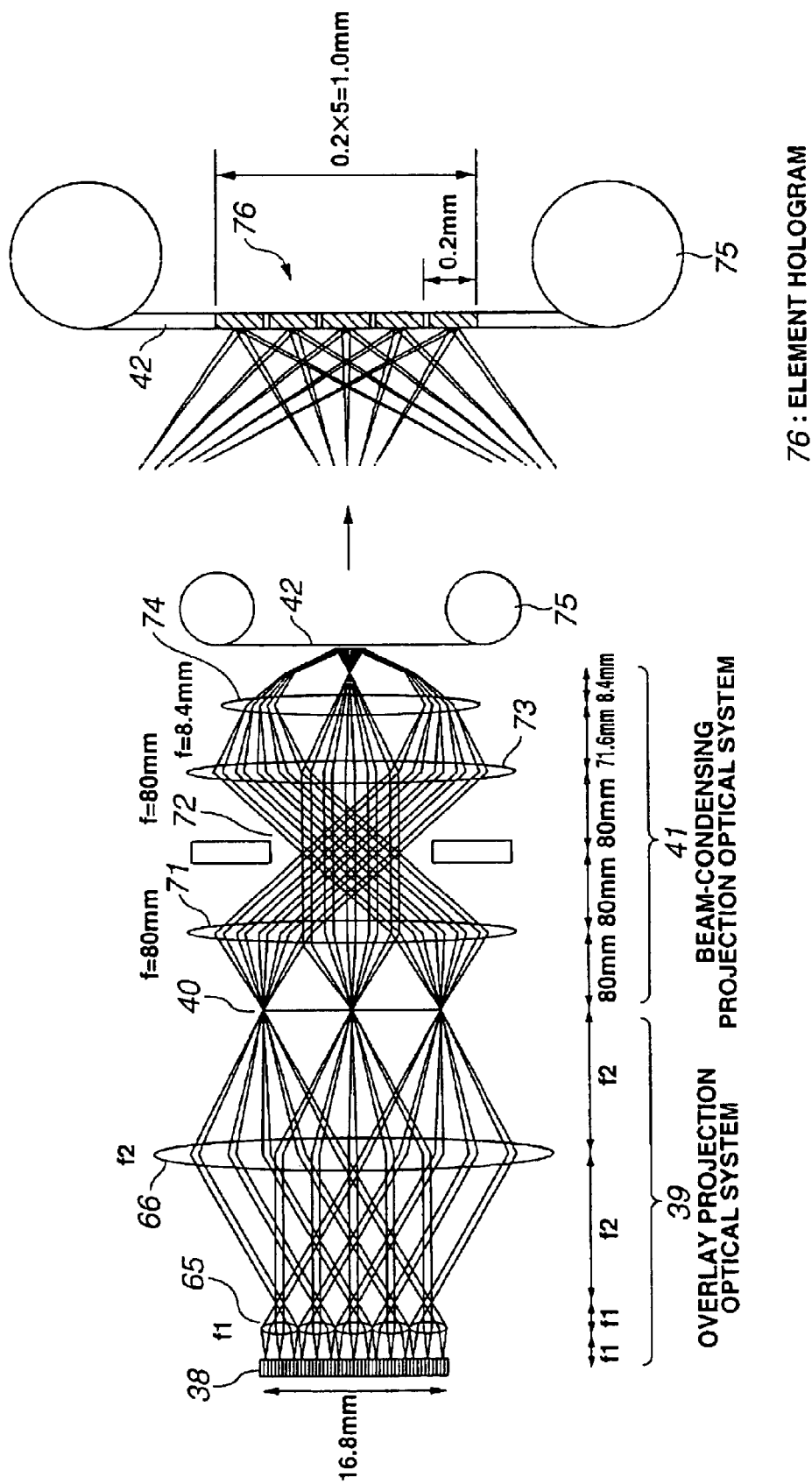
FIG. 9 is a view showing a combination of parallax directions of the superposed projection optical system and the beam-condensing projection optical system.
Figure 10:
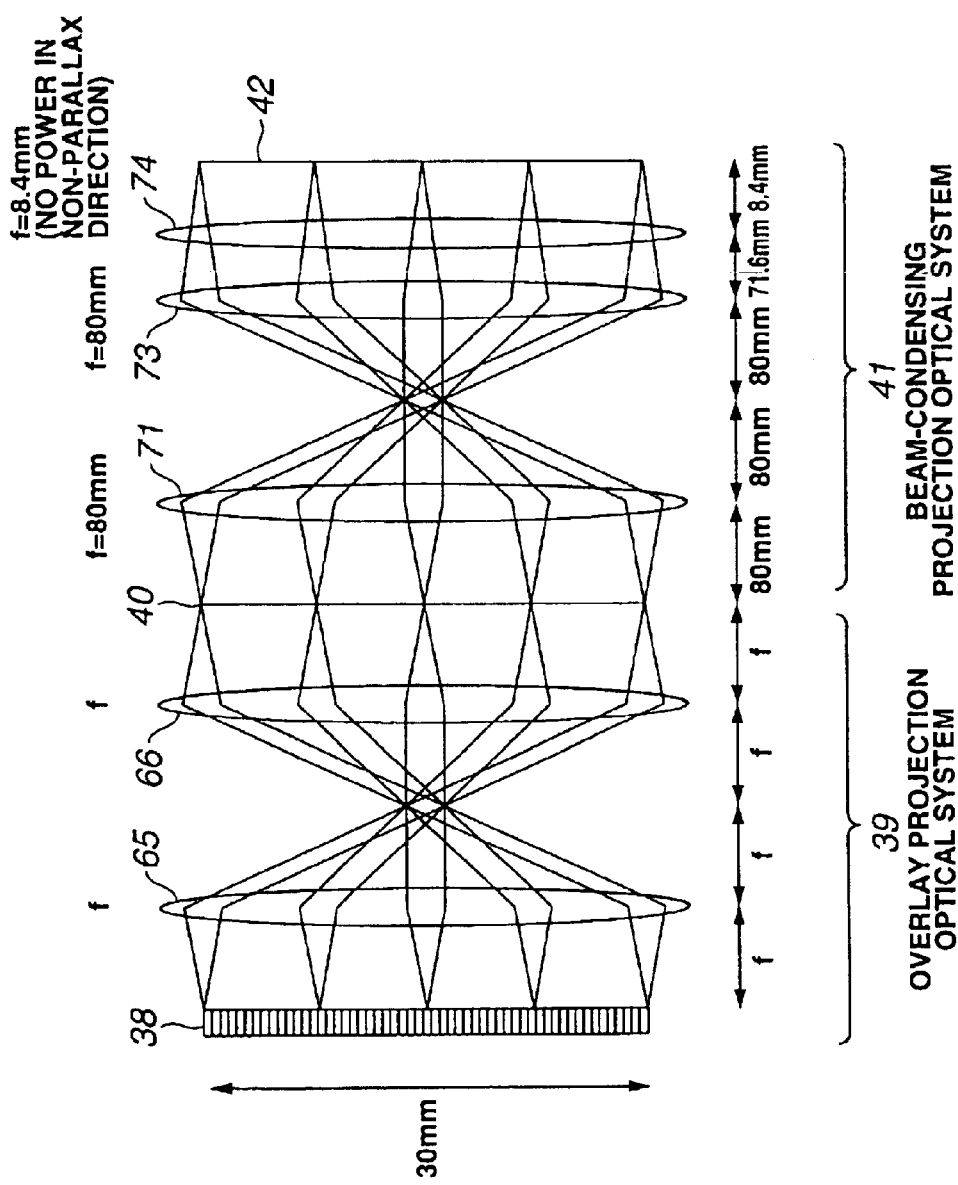
FIG. 10 is a view showing a combination of non-parallax directions of the superposed projection optical system and the beam-condensing projection optical system.

The following describes the principle of exposing a plurality of element holograms 76 at a time through the use of an optical path by combining the beam-condensing projection optical system 41 and the superposed projection optical system 39. FIG. 9 shows a combination of the beam-condensing projection optical system 41 and the superposed projection optical system 39. FIG. 9 is a side view showing the parallax direction. The non-parallax direction is shown in FIG. 10.

The liquid crystal 38 displays, in the parallax direction five images sent from the control computer 2 as shown in FIG. 1. These images are split into five portions under control of this computer. The laser beam passing through the illuminating optical system 36 is evenly applied to the liquid crystal 38. The beam (five images) passing through the liquid crystal 38 enters the lenticular lens 65 split into five portions. The lenticular lens 65 enlarges the five images and sends them to the lens 66. The lens 66 forms each of the images on the 5-portioned liquid crystal 38 as the image 40 to the right of the lens 66. At this time, the images on the 5-portioned liquid crystal 38 are all superposed on the same positions there.

The liquid crystal's image 40 is projected by the first lens 71, passes through the slit 72, and enters the beam-condensing cylindrical lens 74 via the second lens 73. The beam-condensing cylindrical lens 74 condenses the image's beam in the parallax direction for entering the hologram recording medium 42 and forms the image in the non-parallax direction. The superposed projection optical system 39 superposes the five split images from the liquid crystal 38. The beam-condensing projection optical system 41 projects the superposed images on the face of the hologram recording medium 42. At this time, it is understood that five different element holograms 76 are exposed. In this case, five element holograms 76 are exposed at a time. When each element hologram has the width (d) of 0.2 mm, a total of 1.0 mm (five times 0.2 mm) is exposed.

In this example, the hologram recording medium 42 is a hologram film wound around a film cartridge 75. A recording medium feed mechanism (not shown) pulls the hologram recording medium 42 out of the film cartridge 75 and feeds it. The recording medium feed mechanism causes a vibration attenuation wait time, prolonging the time for generating holographic stereograms. By contrast, the holographic stereogram exposure apparatus in the above-mentioned holographic stereogram generation system can record a parallax image sequence comprising five element holograms at a time. It is possible to decrease the number of vibration attenuation wait situations. In total, the time for generating holographic stereograms can be shortened.

Described below is how to determine a focal length for the superposed projection optical system 39. As seen from FIG. 9, the face of the hologram recording medium 42 is conjugate with a focal plane of the lenticular lens 65. Since the face of the hologram 42 is conjugate with the focal plane of the lenticular lens 65, a 0.2 mm interval for the element hologram 76 is equivalent to the following on the focal plane of the lenticular lens 65.

$$0.2 \times (80/8.4) \times (f2/80) \text{ mm}$$

This interval corresponds to the liquid crystal 38 divided by five, namely 16.8 mm /5=3.36 mm, that is to say:

$$0.2 \times (80/8.4) \times (f2/80) = 3.36$$

This results in f2=141.12 mm. The liquid crystal 38 is divided into five portions and needs to be projected five times. Hence, f1=2/5=28.224 mm. The superposed projection optical system 39 in FIG. 10 has a focal length f with the projection magnification of 1 in the non-parallax direction, hence yielding:

$$(28.224 \text{ mm} \times 2 + 141.12 \text{ mm} \times 2) \div 4 = 84.672 \text{ mm}$$

Figure 11:
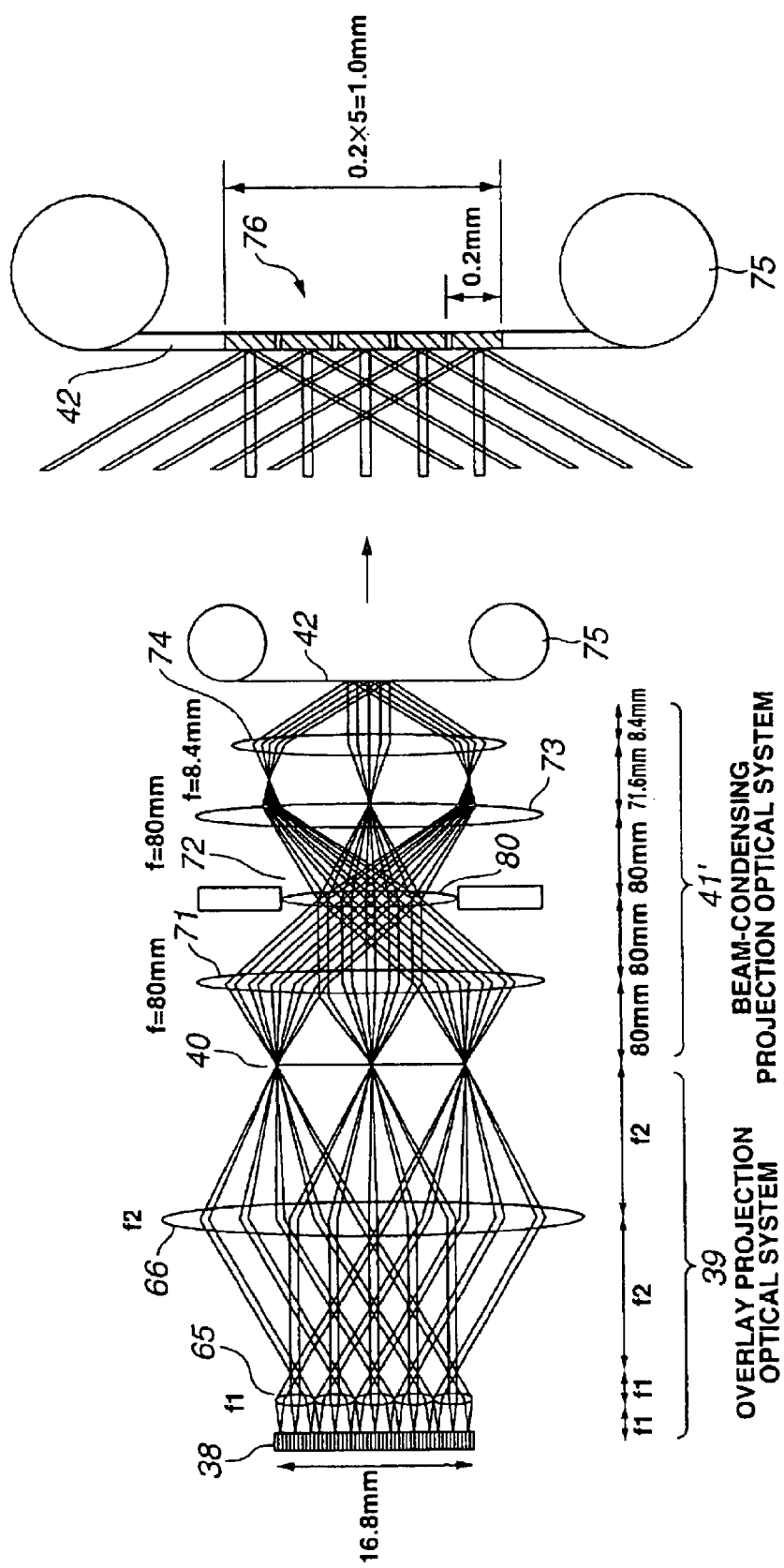
FIG. 11 is a view showing another example of the beam-condensing projection optical system.
Figure 12:
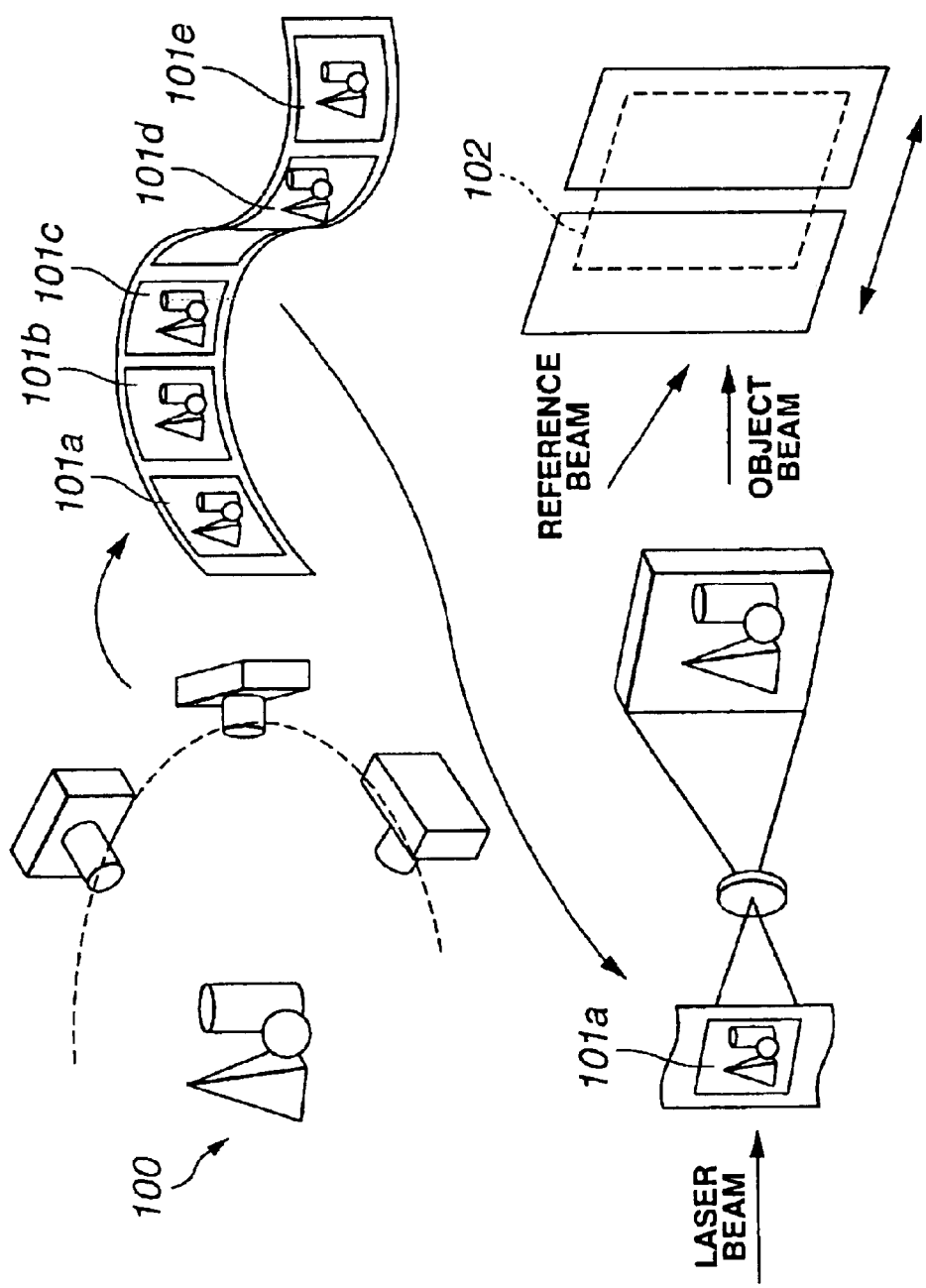
FIG. 12 is a view showing how to generate a holographic stereogram.

The following describes another example (beam-condensing projection optical system 41') of the beam-condensing projection optical system 41 with reference to FIG. 11. The beam-condensing projection optical system 41 in FIG. 9 causes different angles for beams entering the centers of the element holograms 76. Due to such an angle difference, viewing the completed hologram reproduces a different angle range for each element hologram, causing unevenness for the angle of field. As a solution, the beam-condensing projection optical system 41' in FIG. 11 uses a correction lens at the slit 72 between the first lens 71 and the second lens. This correction lens parallels beams entering the centers of the element holograms 76. Specifically, there is provided a correction cylindrical lens 80 at the slit 72 so that the lens has a power only in the parallax direction. As shown in the enlarged view near the hologram, the lens adjusts angles of the object beams entering the centers of the element holograms. Hence, it is possible to correct unevenness of the angles of field for the element holograms on the hologram recording medium 42. In FIG. 1, the correction cylindrical lens 80 uses a focal length of approximately 381 mm. When the completed hologram is viewed, the beam-condensing projection optical system 41' prevents a different angle range from being reproduced for each element hologram. This means that the angle of field is free from unevenness, preventing the problem.

The invention has been described in terms of a specific embodiment for the optical system which can simultaneously expose a plurality of slits at a time. This optical system is characteristic of the present invention. However, the above-mentioned description uses ideal lenses. Actually, correction of aberrations needs to be considered. Further, the above description based on ideal lenses assumes that the parallax direction and the non-parallax direction are fully independent of each other. Actually, they are not independent. The design needs to consider this point.

A modification of the present invention may be application to, say, a full parallax hologram, namely a hologram which provides parallaxes not only in the horizontal direction but also in the vertical direction. Obviously, this can be implemented by using five-by-five divisions and ordinary lenses while the above-mentioned embodiment uses the liquid crystal and the cylindrical lens divided into five portions.

The above-mentioned embodiment uses the projection magnification of 1 for the non-parallax direction in the beam-condensing projection optical system. Apparently, another modification can use different magnifications. In this case, it is necessary to change various parameter values described in the above-mentioned embodiment. However, new values can be easily found by using the similar equations.

The slit 72 is provided between the first lens 71 and the second lens 73 in the beam-condensing projection optical system 41 shown in FIGS. 8 and 9 and in the beam-condensing projection optical system 41' shown in FIG. 11. Instead of using this slit, it may be preferable to provide a plurality of slits between the lenticular lens 65 and the lens 66 in the superposed projection optical system 39. Alternatively, it may be preferable to provide a partition between the 5-portioned liquid crystal 38 and the lenticular lens 65 so that the partition is parallel to the beams. In these cases, the beam-condensing projection optical system 41' should provide the correction cylindrical lens 80 between the first lens 71 and the second lens 73.

The present invention can expose a plurality of element holograms at a time, decreasing the number of vibration attenuation wait situations. In total, the time for generating holographic stereograms can be shortened. It is also possible to improve efficiency of the optical system for using light beams.

For ease in understanding the drawings, the following identifies the reference numerals and their respective denoted features.

1 Data processing section
2 control computer
3 holographic stereogram exposure apparatus
31 laser beam source
35 object beam optical system
36 illuminating optical system
38 liquid crystal
39 superposed projection optical system
40 liquid crystal image
41 beam-condensing projection optical system
42 hologram recording medium
44 reference beam optical system

What is claimed is:

1. A holographic stereogram exposure apparatus for exposing three-dimensional image information on a hologram recording medium to produce a holographic stereogram, said apparatus comprising:

spatial light modulation section having a plurality of portions in a parallax direction, a portion of said plurality of portions displaying an image of a plurality of adjacent images, each of said plurality of adjacent images corresponding to a respective element hologram;

an overlay projection optical system receiving a light beam that has passed through said plurality of portions and superposing said plurality of adjacent images displayed on said spatial light modulation section to form a superposed image of said plurality of adjacent images; and a beam-condensing projection optical system condensing said superposed image in said parallax direction and separating said plurality of adjacent images from said condensed superposed image in said parallax direction, said plurality of adjacent images being separated from said condensed superposed image for recording onto said hologram recording medium, a separated image of said separated plurality of adjacent images being recorded onto said hologram recording medium adjacent in said parallax direction to another separated image of said separated plurality of adjacent images.

2. The holographic stereogram exposure apparatus according to claim 1, further including a reference beam optical system that projects a reference beam onto said hologram recording medium for interference with said plurality of adjacent images projected on said hologram recording medium.

3. The holographic stereogram exposure apparatus according to claim 1, wherein said spatial light modulation section is divided into a horizontal direction.

4. The holographic stereogram exposure apparatus according to claim 1, wherein said spatial light modulation section is divided into both vertical and horizontal directions.

5. The holographic stereogram exposure apparatus according to claim 1, wherein said beam-condensing projection optical system projects said superposed image onto said hologram recording medium in a non-parallax direction.

6. The holographic stereogram exposure apparatus according to claim 1, wherein said beam-condensing projection optical system uses a first-group lens and a second-group lens to guide said superposed image to a beam-condensing cylindrical lens.

7. The holographic stereogram exposure apparatus according to claim 6, wherein said beam-condensing projection optical system is provided with a correction lens between said first-group lens and said second-group lens for correcting unevenness of the angle of field for each element hologram on said hologram recording medium.

8. The holographic stereogram exposure apparatus according to claim 1, wherein said separated plurality of adjacent images is simultaneously recorded onto said hologram recording medium.

9. The holographic stereogram exposure apparatus according to claim 1, wherein said image is recorded onto said hologram recording medium separated from and adjacent to said another image.

10. A holographic stereogram generation system for recording three-dimensional image information on a hologram recording medium and generating a holographic stereogram, comprising:

an image generation system generating a plurality of adjacent images in a parallax direction, said image generation system including a spatial light modulation section having a plurality of portions in said parallax direction, a portion of said plurality of portions displaying an image of said plurality of adjacent images, each of said plurality of adjacent images corresponding to a respective element hologram;

an overlay projection optical system receiving a light beam that has passed through said plurality of portions and superposing said plurality of adjacent images displayed on said spatial light modulation section to form a superposed image of said plurality of adjacent images; and a beam-condensing projection optical system condensing said superposed image in said parallax direction and separating said plurality of adjacent images from said condensed superposed image in said parallax direction, said plurality of adjacent images being separated from said condensed superposed image for recording onto said hologram recording medium, a separated image of said separated plurality of adjacent images being recorded onto said hologram recording medium adjacent in said parallax direction to another separated image of said separated plurality of adjacent images.

11. The holographic stereogram generation system according to claim 10, wherein said separated plurality of adjacent images is simultaneously recorded onto said hologram recording medium.

12. The holographic stereogram generation system according to claim 10, wherein said image is recorded onto said hologram recording medium separated from and adjacent to said another image.

13. A holographic stereogram exposure method of exposing three-dimensional image information onto a hologram recording medium to produce a holographic stereogram, said method comprising:

displaying a plurality of adjacent images in a parallax direction, each of said plurality of adjacent images corresponding to a respective element hologram;

forming a plurality of divided light beams, a divided light beam of said plurality of divided light beams being a light beam passed through a image of said displayed plurality of adjacent images;

superposing said plurality of divided light beams to form a superposed image of said displayed plurality of adjacent images;

condensing said superposed image in said parallax direction;

separating said condensed superposed image into said plurality of adjacent images, said plurality of adjacent images being separated in said parallax direction; and recording said separated plurality of adjacent images onto said hologram recording medium, a separated image of said separated plurality of adjacent images being recorded onto said hologram recording medium adjacent in said parallax direction to another separated image of said separated plurality of adjacent images.

14. A holographic stereogram exposure method of claim 13, wherein said separated plurality of images is simultaneously recorded onto said hologram recording medium.

15. A holographic stereogram exposure method of claim 13, wherein said image is recorded onto said hologram recording medium separated from and adjacent to said another image.

* * * * *